(12) United States Patent
Teeter (10) Patent No.: US 10,729,078 B2
(45) Date of Patent: Aug. 4, 2020

(54) MOBILE DRIP IRRIGATION WITH PRECISE AND UNIFORM WATER DISTRIBUTION

(71) Applicant: Monty J. Teeter, Ulysses, KS (US)

(72) Inventor: Monty J. Teeter, Ulysses, KS (US)

( * ) Notice: Subject to any disclaimer, the term of this patent is extended or adjusted under 35 U.S.C. 154(b) by 0 days.

(21) Appl. No.: 15/213,395

(22) Filed: Jul. 19, 2016

(65) Prior Publication Data

US 2016/0324083 A1 Nov. 10, 2016

Related U.S. Application Data (62) Division of application No. 14/444,899, filed on Jul. 28, 2014, now Pat. No. 9,420,752.

(51) Int. Cl.
*A01G 25/09* (2006.01)
*A01G 25/02* (2006.01)

(52) U.S. Cl.
CPC ......... *A01G 25/092* (2013.01); *A01G 25/023* (2013.01); *A01G 25/09* (2013.01); *Y02A 40/237* (2018.01)

(58) Field of Classification Search
CPC ..... A01G 25/023; A01G 25/09; A01G 25/092
USPC ................................. 239/722, 723, 734, 726
See application file for complete search history.

(56) References Cited

U.S. PATENT DOCUMENTS

| | | | |
|---|---|---|---|
| 2,174,600 A | 10/1939 | Schutmaat | |
| 2,249,130 A * | 7/1941 | Gunther | A01G 25/097 239/724 |
| 3,498,314 A | 3/1970 | Gheen | |
| 3,643,442 A | 2/1972 | Houston | |
| 3,693,888 A * | 9/1972 | Rondas | A01G 25/023 239/533.13 |
| 3,784,106 A | 1/1974 | Ross | |
| 3,870,235 A | 3/1975 | Newell | |
| 4,350,295 A * | 9/1982 | Gheen | A01G 25/09 137/355.21 |
| 4,429,831 A | 2/1984 | Maddox | |
| 4,676,438 A * | 6/1987 | Sesser | A01G 25/092 239/391 |
| 4,763,836 A * | 8/1988 | Lyle | A01G 25/09 239/243 |
| 4,771,947 A | 9/1988 | Smeller et al. | |
| 4,970,973 A * | 11/1990 | Lyle | A01C 7/004 111/127 |
| 5,131,597 A * | 7/1992 | Bard | A01G 25/02 239/145 |
| 5,251,938 A * | 10/1993 | Erickson | F16L 37/084 285/121.6 |
| 5,267,695 A | 12/1993 | Thayer | |
| 5,294,058 A | 3/1994 | Einav | |
| 5,421,514 A * | 6/1995 | McKenry | A01M 21/00 239/10 |

(Continued)

*Primary Examiner* — Chee-Chong Lee
*Assistant Examiner* — Joseph A Greenlund
(74) *Attorney, Agent, or Firm* — Erickson Kernell IP, LLC; Kent R. Erickson (57) ABSTRACT

Water is emitted directly onto the soil from drip lines pulled from a mobile drip irrigation device. The forward ends of the drip tubes are anchored and retained to establish relatively fixed intervals of spacing between the forward ends of the adjacent drip tubes to guide the drip tubes across the soil and through growing plants. A pressure-regulated constant-volume flow of water is emitted from ports in the drip tubes.

13 Claims, 7 Drawing Sheets

(56) References Cited

U.S. PATENT DOCUMENTS

| | | | |
|---|---|---|---|
| 5,586,728 A | 12/1996 | McKenry | |
| 5,678,771 A * | 10/1997 | Chapman | A01G 25/092 239/727 |
| 5,779,163 A * | 7/1998 | Gunter | A01G 25/092 239/728 |
| 5,937,489 A | 8/1999 | Gunter | |
| 5,947,393 A * | 9/1999 | Unruh | A01G 25/092 239/729 |
| 6,042,031 A * | 3/2000 | Christensen | A01G 25/092 239/729 |
| 6,343,749 B1 * | 2/2002 | Thom | A01G 25/092 239/1 |
| 6,666,384 B2 * | 12/2003 | Prandi | A01G 25/092 239/1 |
| 6,745,985 B2 * | 6/2004 | Healy | F16L 3/13 248/75 |
| 7,883,035 B2 * | 2/2011 | Coleman | A01G 25/092 239/728 |
| 8,210,445 B2 | 7/2012 | Coleman et al. | |
| 8,511,586 B2 * | 8/2013 | Einav | A01G 25/023 239/542 |
| 8,770,233 B2 * | 7/2014 | Mezzalira | D04B 1/225 138/125 |
| 8,882,006 B2 * | 11/2014 | Korus | F16L 35/00 138/120 |
| 9,066,476 B2 * | 6/2015 | Christiansen | A01G 25/092 |
| 9,420,752 B2 * | 8/2016 | Teeter | A01G 25/09 |
| 2007/0176030 A1 * | 8/2007 | Korus | A01G 25/092 239/729 |
| 2012/0080545 A1 * | 4/2012 | Korus | A01G 25/092 239/723 |
| 2013/0248622 A1 * | 9/2013 | Kim | A01G 25/023 239/542 |
| 2015/0298145 A1 * | 10/2015 | Sauser | B05B 12/087 239/451 |
| 2015/0351333 A1 * | 12/2015 | Eberle | A01G 25/02 239/548 |
| 2016/0021835 A1 | 1/2016 | Teeter | |
| 2019/0008101 A1 * | 1/2019 | Teeter | A01G 25/092 |

\* cited by examiner

MOBILE DRIP IRRIGATION WITH PRECISE AND UNIFORM WATER DISTRIBUTION

CROSS REFERENCE TO RELATED INVENTION

This is a division of U.S. application Ser. No. 14/444,899, filed Jul. 28, 2014, now U.S. Pat. No. 9,420,752, issued Aug. 23, 2016. The subject matter of U.S. application Ser. No. 14/444,899 is incorporated fully herein by this reference.

FIELD OF THE INVENTION

This invention relates to mobile drip irrigation in which drip tubes are pulled across the soil to directly emit water onto the soil for irrigating growing plants. More particularly, the present invention relates to new and improved techniques for more precisely and effectively distributing the water from the drip tubes over an entire agricultural field, resulting in enhanced and earlier growth of the plants, less water use and more effective irrigation from the available water used. Further still, the present invention involves overcoming significant practical and operational problems of previous mobile drip irrigation systems to achieve more reliable and trouble-free operation.

BACKGROUND OF THE INVENTION

The typical mobile irrigation systems uses an overhead water distribution conduit which is supported by motorized towers that move the water distribution conduit over an agricultural field. Predominantly, such mobile irrigation systems are a center pivot type, in which the water distribution conduit is oriented radially with respect to a water supply pipe in the center of the agricultural field, and the motorized towers move the radially-extending water distribution conduit in a circular or arcuate path over the field. Linear mobile irrigation systems are also known, and such systems advance a laterally-extending water distribution conduit linearly across the field. Sprinkler nozzles attached to the water distribution conduit to shoot jets of water over long distances through the air to irrigate substantial expanses of the agricultural field. A significant portion of the emitted water is nebulized when the jet is created, resulting in a significant loss of water due to evaporation before the remaining water reaches the soil.

To reduce the amount of water lost to evaporation, drop lines have been attached to the overhead water distribution conduit. Spray heads are attached to the bottom ends of the drop lines a few feet above the soil and the growing plants. The spray from the heads does not extend great distances through the air, thus reducing the amount of water lost to evaporation. However the amount of water lost to evaporation is still significant, and even the sprayed water which reaches the plants is susceptible to some evaporation due in part to some of the water collecting on the leaves and evaporating before reaching the soil.

In a further effort to reduce evaporation, mobile drip irrigation systems have been devised to pull drip tubes through the agricultural field. The drip tubes are pulled along the soil from the moving water distribution conduit. Water is emitted directly from the drip tubes onto the soil. The emitted water quickly penetrates directly into the soil with little evaporation. The water is also less susceptible to displacement from its desired location of application due to the effects of wind.

Even though mobile drip irrigation systems are recognized as offering a greater potential for water conservation, previous mobile drip irrigation systems have not been widely accepted, despite their availability for many decades. The lack of acceptance is centered around uneven and unreliable water distribution coupled with many practical and operational problems associated with using previous mobile drip irrigation systems.

One problem of previous mobile drip irrigation systems is an inability to reliably and consistently control the paths taken by the drip tubes as they are pulled through the agricultural field. The drip tubes have a tendency to follow divergent and convergent pathways. When the pathways of adjacent drip tubes diverge, gaps and spaces occur in the field where little or no water is distributed. When the pathways of the drip tubes converge, excess water is applied to localized areas. Of course, those gaps with inadequate or no water do not promote the growth of the agricultural plants, but instead encourage the growth of naturally occurring weeds which diminish the overall quality of the agricultural production. Those plants which grow despite minimal irrigation are diminished in size and their maturity is delayed, which again diminishes the overall productivity from the agricultural field. Those spaces with excess water may prevent the germination and the optimal growth of the plants. Excess water may also create a hard exterior crust of soil known as "hardpan" which inhibits later-applied water from penetrating the soil effectively or which inhibits plant growth because of the difficulty of the growing plant to penetrate through the hard crust.

One operational problem which has plagued previous mobile drip irrigation systems is that the drip tubes frequently become tangled together due to the lack of control over the pathways taken by the drip tubes. The drip tubes may even become wound around the wheels of the motorized towers which move the overhead water distribution conduit through the field. Agricultural plants which have stiff stalks have the capability of tangling the drip tubes, thereby misdirecting the drip tubes from their intended movement pathways.

Reversing the direction of movement of mobile drip irrigation systems is necessary in those agricultural fields where a pivot mobile drip irrigation system does not circumscribe a complete circular pattern and where a linear mobile drip irrigation system reaches the end of the agricultural field. Reversing direction in previous mobile drip irrigation systems is particularly problematic because the reversal kinks or bends the drip tubes enough to choke off or substantially diminish water emission, even after the reversal in direction is completed.

The drip tubes of previous mobile drip irrigation systems are also susceptible to accelerated wear due to the friction of moving over the soil, particularly during cold weather and when used in sandy soil or soil which contains a large content of substantially sized solid particles. The frozen, sandy or particulate soil creates enough friction against the drip tubes as they move over the soil to wear unintended openings in the drip tube through which excess and uncontrolled water is delivered.

Manual intervention and repair is required to remedy the operational problems prevalent in previous drip irrigation systems. While taking the necessary corrective action, the mobile drip irrigation system is inoperative. Because of the persistent and repeating nature of these problems, the time required to undertake the corrective actions may reduce the amount of irrigation of the agricultural field as a whole to the point where the productivity of the agricultural crop is compromised.

Since water is a natural resource of ever-increasing scarcity, water conservation and more effective irrigation from the available amount of water are important requirements of modern agricultural irrigation.

SUMMARY OF THE INVENTION

This invention involves anchoring and retaining drip tubes of a mobile drip irrigation device at substantially fixed positions and intervals relative to a water distribution conduit of the mobile drip irrigation device to guide the drip tubes through an agricultural field and to facilitate keeping the drip tubes moving in desired pathways or tracks. The substantially fixed positions and intervals establish the pathways of the drip tubes to distribute the water in a uniform and precisely controlled pattern throughout the agricultural field, thereby ensuring that the growing plants receive the optimal amount of water to grow and achieve enhanced productivity without wasting or ineffectually applying the water. Water emitters of the drip tubes deliver a predetermined constant flow or volume of water to enable each drip tube to deliver a precisely controlled amount of water onto the soil over the pathway traversed.

The invention also involves solving many of the operational deficiencies of previous mobile drip irrigation systems. Anchoring and retaining the drip tubes at substantially fixed positions and intervals inhibits the drip tubes from tangling with one another, with the wheels of the motorized towers, with the growing plants, and with the furrows in which the plants are growing. Reversing the direction of the mobile drip irrigation system is facilitated by providing a capability for flexibility, bending and pivoting at the leading ends of the drip tubes. The flexibility, bending and pivoting capability allows the drip tubes to reverse direction without kinking or choking off the water supply. The leading end of the drip tubes also have an enhanced resistance to abrasion caused by movement over the ground, thereby reducing the occurrence of holes worn into the drip tubing. Overcoming these previous operational deficiencies allows the mobile drip irrigation device to operate in a reliable, consistent and constant manner while incurring less downtime, thereby achieving more effective irrigation.

In accordance with these considerations, one basic aspect of the invention involves a mobile drip irrigation device having a water distribution conduit supported for movement above the soil and having drip tubes operatively connected at their forward ends to receive water from the water distribution conduit. The drip tubes contact and move over the soil during movement of the mobile drip irrigation device while emitting the water directly onto the soil to irrigate plants growing in the soil. Forward ends of the drip tubes are operatively connected by an anchoring and retention structure which retains the forward ends of the drip tubes at substantially fixed predetermined positions relative to the water distribution conduit. The predetermined positions establish relatively fixed intervals of spacing between the forward ends of the adjacent drip tubes to guide the drip tubes across the soil and through the plants.

Another basic aspect of the invention involves a mobile drip irrigation device comprising a plurality of drip tubes positioned to contact and move across soil while emitting water from the drip tubes directly onto the soil. Each drip tube comprises a plurality of ports formed through the drip tube at predetermined intervals along the length of the drip tube. A plurality of constant flow emitters are associated with each port. Each emitter responds to a predetermined pressure of water within the drip tube to deliver a constant volume of water through the port.

A further basic aspect of the invention involves a drip tube for a mobile drip irrigation device which comprises a plurality of pressure responsive constant volume emitters positioned within the drip tube at predetermined fixed intervals along the length of the drip tube to deliver a constant volume of water through a port in the drip tube with which the emitter is associated.

Another basic aspect of the invention involves a method of irrigating plants growing in soil by emitting water directly onto the soil from drip lines pulled from a mobile drip irrigation device. The forward ends of the drip tubes are anchored and retained at substantially fixed predetermined positions relative to a water distribution conduit of the mobile drip irrigation device to establish relatively fixed positions and intervals of spacing between the forward ends of the adjacent drip tubes. The drip tubes are guided across the soil and through the plants from their anchored and retained forward ends.

One further basic aspect of the invention involves a method of irrigating plants growing in soil by delivering a pressure regulated constant volume of water directly onto the soil through ports of drip lines moved over the soil.

Subsidiary and other aspects of the invention involve some or all of the following features. The forward ends of the drip tubes are anchored and retained against substantial movement perpendicularly and longitudinally relative to the water distribution conduit. The predetermined positions of the forward ends of the drip tubes are within distance of about four feet above the soil. A plurality of substantially rigid drop tubes are connected to receive water from the water distribution conduit at an upper portion of the drop tube, and the lower portion of each drop tube is connected to the forward end of one drip tube, with the lower portion of each drop tube anchored and retained to establish the predetermined positions from which the connected drip tube is guided over the soil and through plants. The upper portion of the rigid drop tube is also anchored and retained to assist in establishing the predetermined positions for guiding the drip tubes. Anchoring and retaining the substantially rigid drop tubes at their upper portions is accomplished by an anchoring cable extending between adjacent motorized towers which support the water distribution conduit above the soil and by a guide member connected to a lower portion of each drop tube. A manifold is connected to receive water from the water distribution conduit and supply the water to drip tubes connected to the manifold. The manifold is anchored and retained to establish the predetermined positions from which the connected drip tubes are guided over the soil and through plants. Each drip tube comprises a section of wear resistant relatively flexible hose and a section of relatively less flexible water emitting tubing connected to the flexible hose section for delivering water onto the soil. The flexible hose section has sufficient length to curve downwardly into contact with the soil and orient the water emitting section essentially parallel to the soil. The flexible hose section, or a coupling with relatively rotational inlet and outlet portions, guides the drip tube through a reversal in direction of movement without kinking or inducing a permanent bend in the drip tube.

The aspects and features of the invention are described more completely and specifically in the appended claims. A more thorough appreciation of the invention and its scope, as well as the manner in which it obtains improvements and other benefits over previous mobile drip irrigation systems, can be gained by reference to the following detailed description of presently preferred embodiments and the accompanying drawings, which are briefly summarized below.

DETAILED DESCRIPTION OF THE DRAWINGS

DETAILED DESCRIPTION

Figure 1:
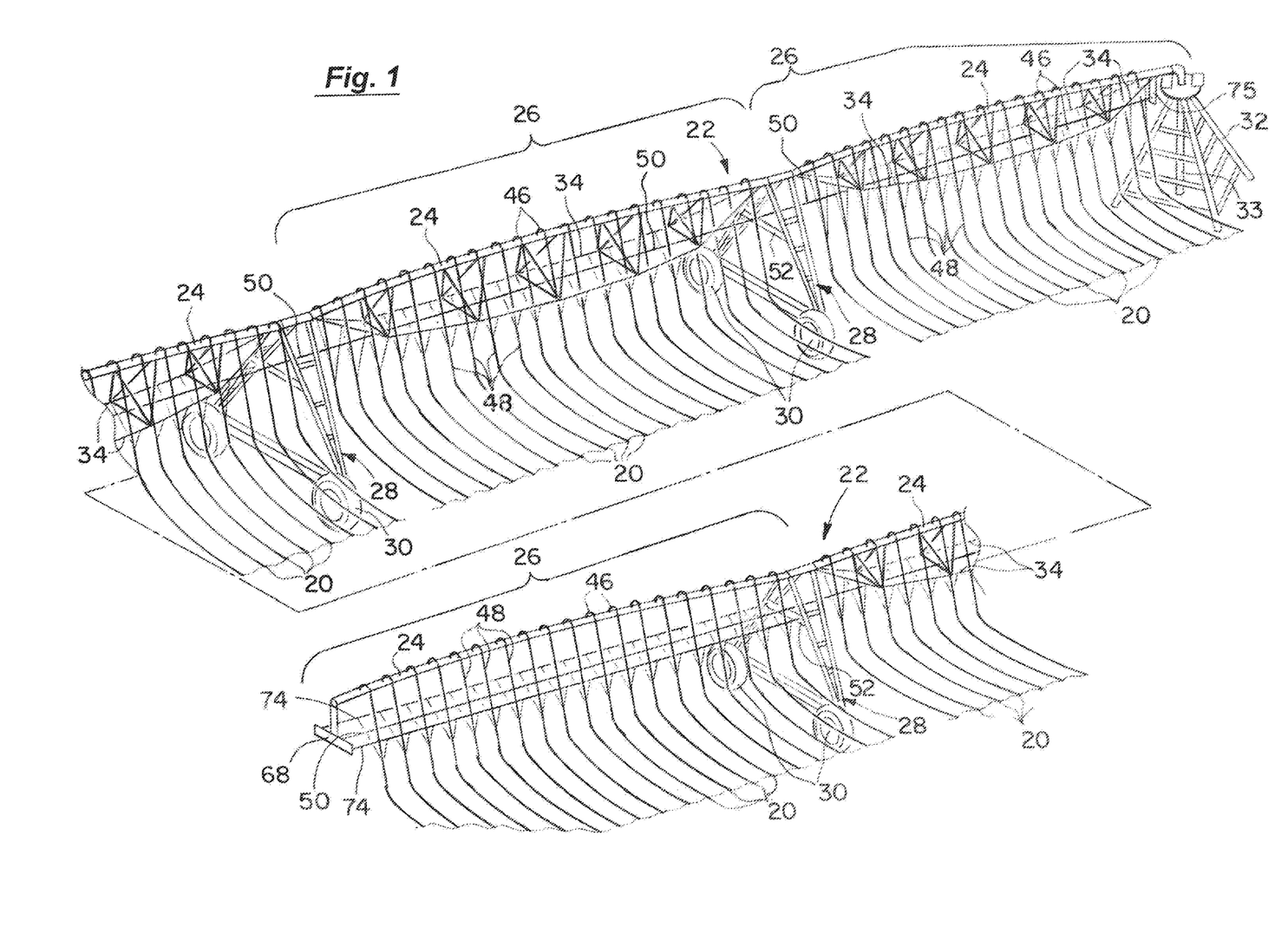
FIG. 1 is a perspective view, with a broken out portion, of a mobile drip irrigation device having drip tubes, which incorporates the present invention.
Figure 2:
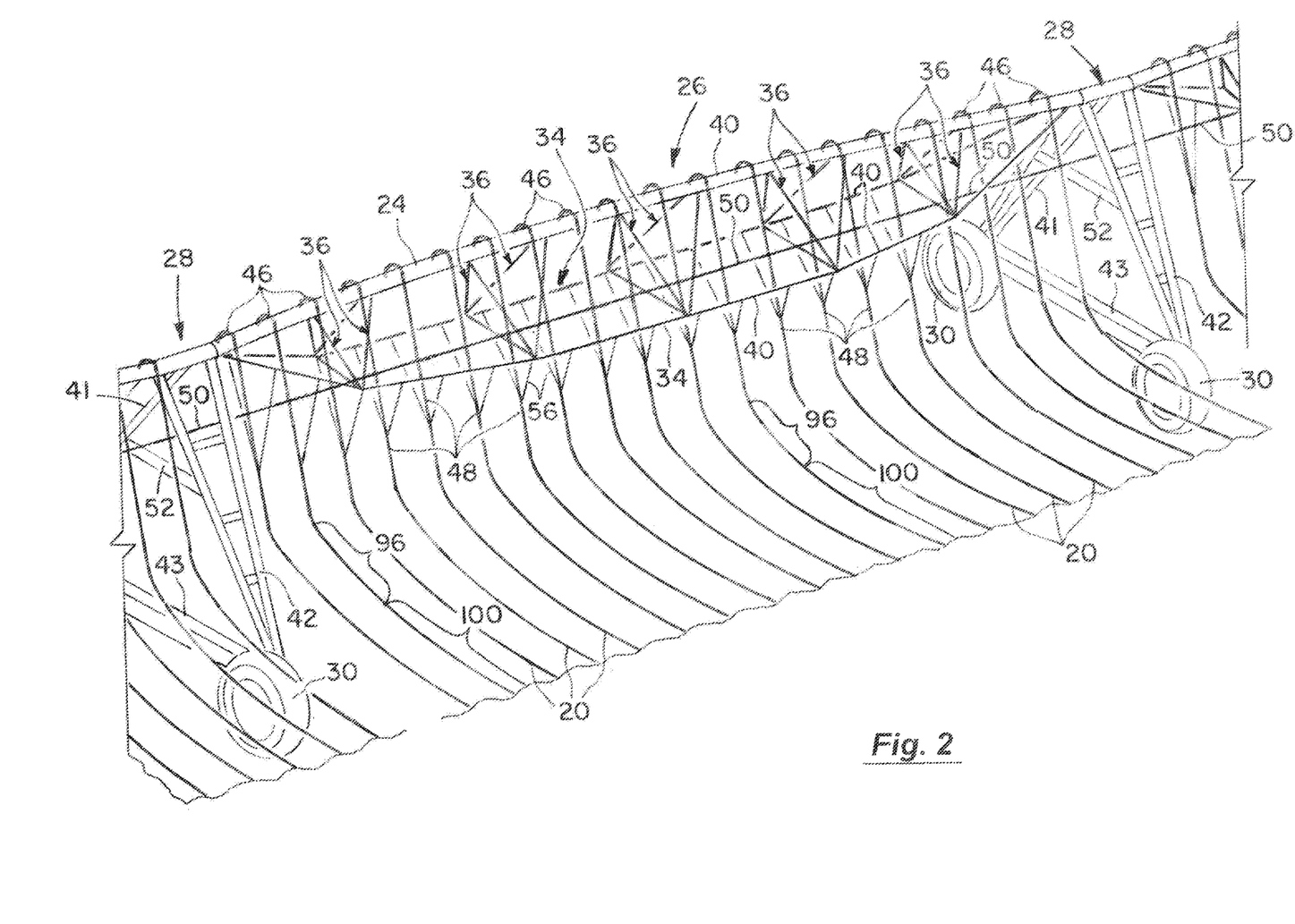
FIG. 2 is an enlarged perspective view of one device segment of the mobile drip irrigation device shown in FIG. 1.

The present invention involves anchoring, retaining, positioning and using drip tubes 20 in a mobile drip irrigation device 22, shown in FIGS. 1 and 2. When the drip tubes 20 are anchored, retained, positioned and used in the manner discussed in more detail below, irrigation water is more precisely, uniformly and effectively distributed over an agricultural field where plants are growing in soil, while simultaneously achieving significant operational and functional improvements.

The mobile drip irrigation device 22 comprises an overhead water distribution conduit 24 formed as a number of connected segments 26 of the device 22. Each device segment 26 extends between and is supported by a motorized tower 28. Each tower 28 includes two wheels 30 which engage the soil of the agricultural field and which are driven by electric or hydrostatic motors (not shown). The wheels 30 of each tower 28 move the distribution conduit 24 over the agricultural field.

An inner end of the distribution conduit 24 is connected by a conventional rotational connection (not specifically shown) to a pivot tower 32. Water flows from a supply conduit 33 of the pivot tower 32 into the distribution conduit 24. The wheels 30 of each tower 28 move the radially-extending distribution conduit 24 in a circular or arcuate path about the pivot tower 32. Conventional guidance and alignment systems control the motors of each tower 28 to keep the device segments 26 in substantial alignment as the mobile irrigation device 22 moves in a circular or arcuate path over an agricultural field.

The mobile irrigation device 22 shown in FIGS. 1 and 2 is a "pivot" or a "center pivot" device, because it pivots in a circular or arcuate path around the pivot tower 32. A related and somewhat similar arrangement of the water distribution conduit 24 and the motorized towers 28 are used in "linear" mobile irrigation devices. Linear mobile irrigation devices advance the laterally-oriented distribution conduit 24 linearly across an agricultural field. The present invention applies to both pivot and linear movement mobile irrigation.

Figure 3:
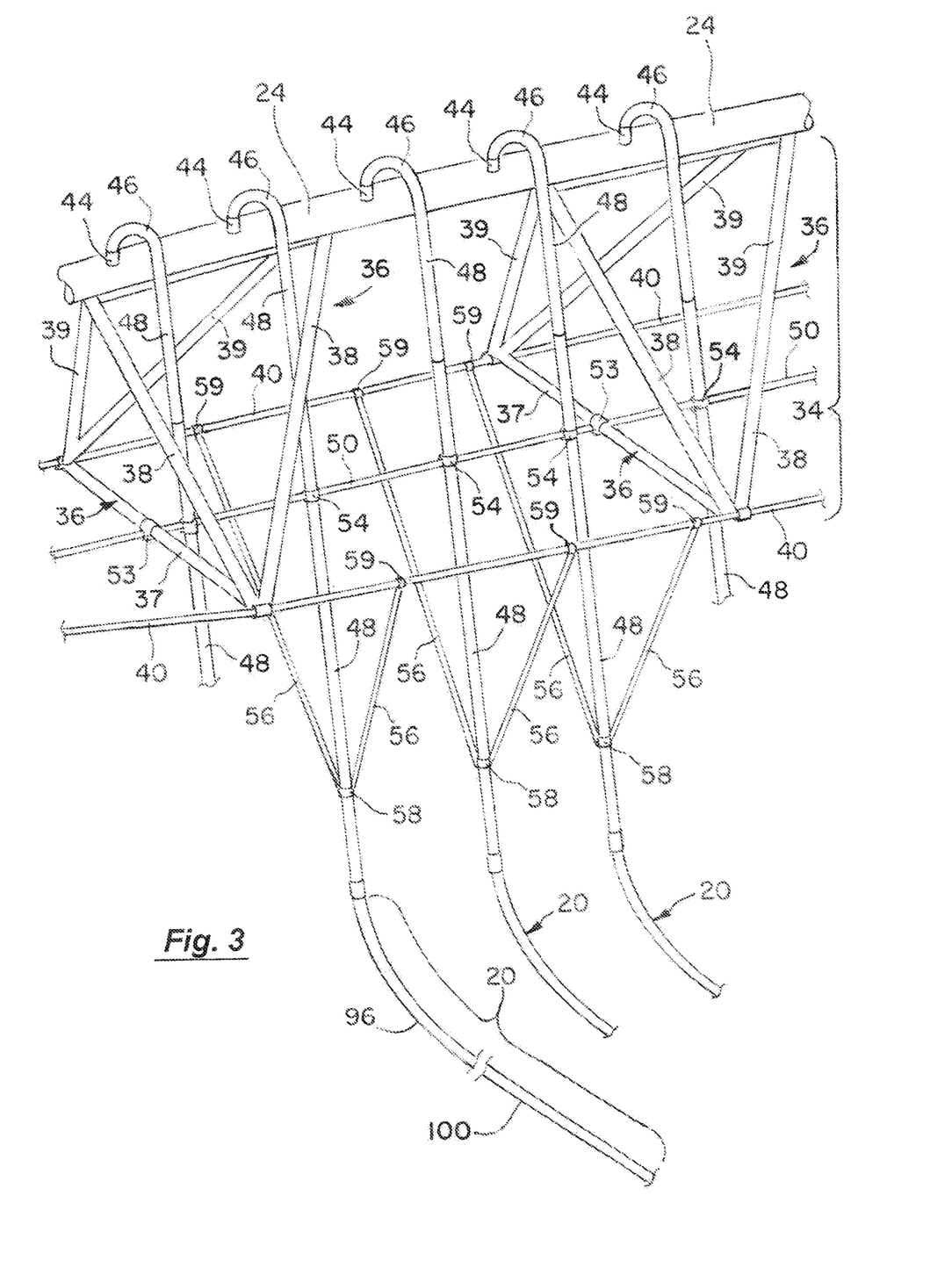
FIG. 3 is a further enlarged perspective view, with portions broken out, of the device segment shown in FIG. 2, illustrating details of anchoring and retaining the drip tubes according to the present invention.

The distribution conduit 24 of each device segment 26 is supported between the motorized towers 28 by a truss structure 34, which is more clearly shown in FIGS. 2 and 3. The truss structure 34 comprises a plurality of triangularly shaped frames 36 located at spaced apart positions along the distribution conduit 24 between the motorized towers 28. An upper end of each triangularly shaped frame 36 is attached to the distribution conduit 24. Each frame 36 includes a horizontally extending brace 37 (FIG. 3) located below the distribution conduit 24. The triangularly shaped frame 36 is completed by two front braces 38 (FIG. 3) which extend from the front end of the horizontal brace 37 and connect to the distribution conduit 24 at spaced apart locations, and by two rear braces 39 (FIG. 3) which extend from the rear end of the horizontal brace 37 and connect to the distribution conduit 24 at spaced apart locations. The two frames 36 located adjacent to the motorized towers 28 are somewhat smaller in size than those frames 36 located in the middle portion of each device segment 26.

The truss structure 34 also includes front and rear truss rods 40 which extend along the length of each device segment 26 and connect to the front and rear ends of the horizontal brace 37 of each triangularly shaped frame 36. Tension in the truss rods 40, and the support of the triangularly shaped frames 36, and the rigidity of the device segments 26, cooperate to maintain the distribution conduit 24 extending longitudinally.

Each motorized tower 28 is formed in a triangular shape by a pair of legs 41 and 42 which extend forward and rearward from the distribution conduit 24, as shown in FIG. 2. A horizontal brace 43 extends between the lower ends of the separated legs 41 and 42 to give each tower 28 the rigidity of a triangular support structure.

The drip tubes 20 receive water supply from spaced apart outlet ports 44 in the distribution conduit 24, as shown in FIGS. 2 and 3. A conventional U-shaped elbow 46 connects to each outlet port 44, and an upper end of a drop tube 48 is connected to each elbow 46. The drip tubes 20 are connected to the lower end of each drop tube 48.

One improvement of the present invention, shown in FIG. 3, involves using substantially rigid drop tubes 48, and anchoring and retaining the substantially rigid drop tubes 48 to establish and maintain a predetermined desired position, even under the resistance force from pulling connected drip tubes 20 through growing plants. With the substantially rigid drop tubes 48 retained in predetermined positions, the drip tubes 20 are guided by the lower ends of the drop tubes 48 to maintain desired or equal intervals of separation in substantially parallel pathways across the agricultural field traversed by the drip tubes 20 as the mobile irrigation device 22 advances. The parallel spaced pathways traversed by the drip tubes 20 evenly distribute the water over the agricultural field. Guiding the drip tubes 20 in the spaced pathways avoids the problems of converging and diverging pathways of previous drip tubes and the resulting spaces and gaps of too much and too little or no water created by previous mobile drip irrigation systems.

Conventional flexible drop tubes are used in previous mobile drip irrigation systems to pull the drip tubes over the agricultural field. The drip tubes are attached to the bottom ends of the flexible drop tubes. The top ends of the flexible drop tubes are connected to the water distribution conduit at a height of about 12 to 16 feet above the soil. The flexibility and length of the drop tubes make them incapable of consistently guiding the drip tubes in desired spaced pathways and maintaining desired intervals between the drip tubes. The flexible drop tubes bend from their upper connection to the water distribution conduit, allowing the drip tubes to follow the converging and diverging pathways and allowing the drip tubes to tangle with one another and with the wheels of the motorized towers. The problem of tangling and divergent and convergent pathways of previous drip tubes is exacerbated when the growing plants reach a size sufficient to create impediments to the movement of the drip tubes through the plants. This is particularly the case with plants having relatively stiff stalks, such as corn and maize. Attaching weights to the bottom of the flexible drop tubes does little or nothing to avoid these problems.

In contrast, the drop tubes 28 of the present invention are retained and anchored to maintain a relatively fixed position at their lower end where the drip tubes 20 connect, even when the drop tubes 28 and the drip tubes 20 encounter growing plants, including plants with stiff stalks. Preferably, the drop tubes 28 are anchored and retained with their lower ends spaced within a range of up to four feet above the soil, and preferably within a range of one to four feet above the soil. Guiding the connected drip tubes 20 from the substantially rigid drop tubes 28 at a height of 4 feet or less from the soil very effectively guides the pulled drip tubes 20 in the desired intervals and pathways to achieve even water distribution and to avoid the tangling and irregular pathways typical in previous mobile drip irrigation systems.

Anchoring and retaining the substantially rigid drop tubes 48 in their fixed predetermined positions is accomplished by connecting an upper portion of each substantially rigid drop tube 48 to an upper anchoring cable 50. The anchoring cable 50 is connected to an extends between brackets 52 which have been connected to the legs 41 and 42 of adjacent motorized towers 28, as best shown in FIGS. 1-3. Clamps 53 (FIG. 3) connect the upper anchoring cable 50 to the middle of the horizontal braces 37 of the triangularly shaped frames 36 of the truss structure 34. A clamp 54 (FIG. 3) connects the upper portion of the drop tube 48 to the anchoring cable 50, at a position within approximately the upper one-third of the length of the drop tube 48. The connections of the upper portion of the drop tube 48 to the elbow 46 and to the anchoring cable 50 cause each substantially rigid drop tube 48 to resist movement in a direction parallel to the distribution conduit 24.

Each substantially rigid drop tube 48 is also anchored and retained to resist forward and backward movement perpendicular to the distribution conduit 24, as shown in FIG. 3. The connection of the anchoring cable 50 to the horizontal braces 37 prevents the anchoring cable 50 and the connected drop tubes 48 from deflecting significantly rearwardly as each device segment 26 advances forward. Forward and backward retention of the lower portion of the substantially rigid drop tubes 48 is facilitated by guide wires 56. The guide wires 56 are connected by a clamp 58 at a position within approximately the lower one third of the length of the drop tube 48. The guide wires 56 extend from the clamp 58 upward and forward, and upward and rearward, to the front and rear truss rods 40, respectively. The upper ends of the two guide wires 56 are connected to the truss rods 40 by clamps 59. The truss rods 40 are held in a stationary position by the triangularly shaped frames 36.

The triangular support of each lower portion of each substantially rigid drop tube 48 by the guide wires 56 and the truss rods 40, and the support of the upper portion of each substantially rigid drop tube 48 by the anchoring cable 50 has the effect of anchoring and retaining the drop tubes 48 against significant movement parallel to and perpendicular to the water distribution conduit 24. Anchoring and retaining the substantially rigid drop tubes 48 in this manner causes their lower ends of the drop tubes to guide and pull the drip tubes 20 along the predetermined desired pathways on the soil and through the plants.

Figure 4:
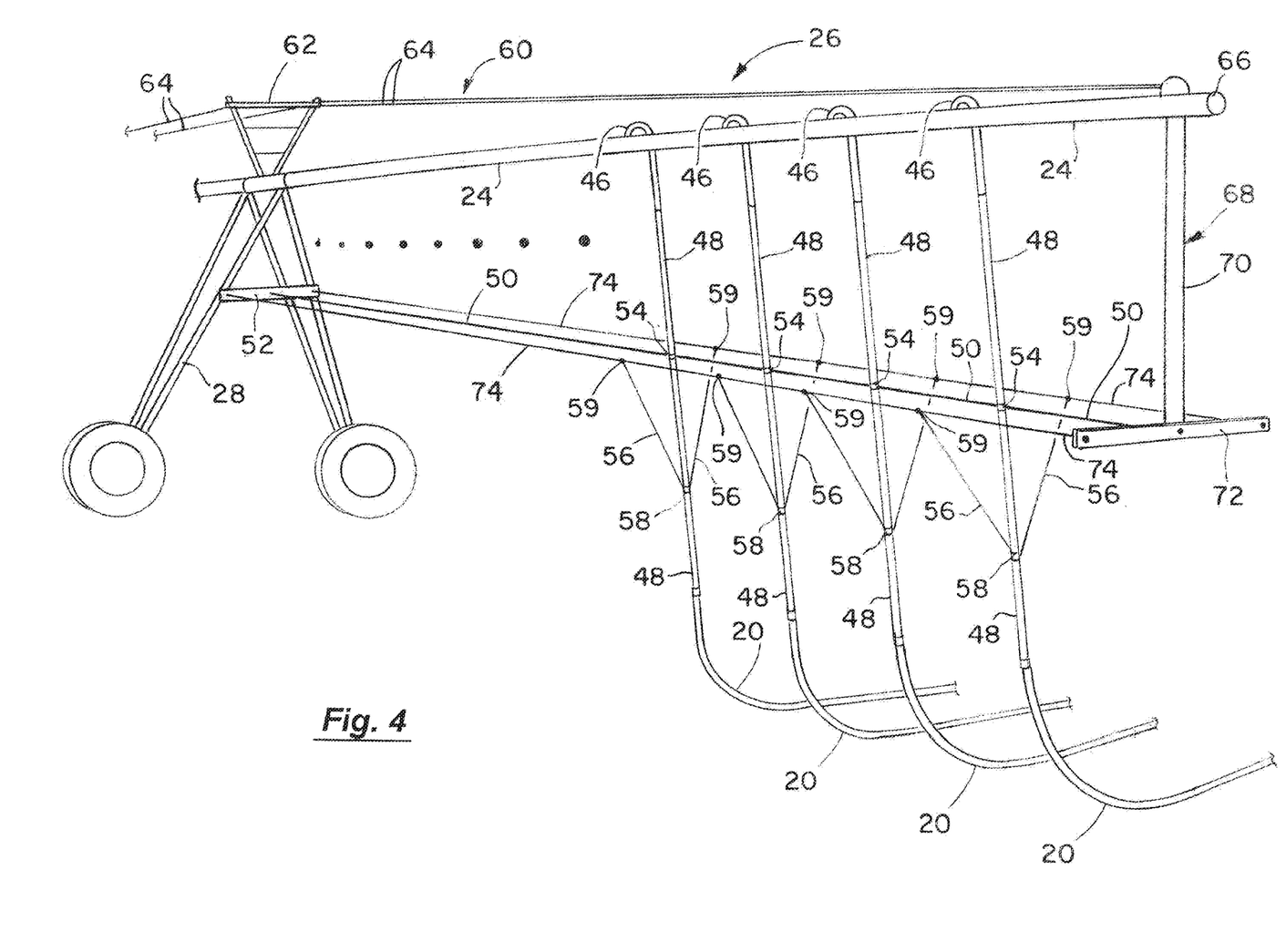
FIG. 4 is a perspective view similar to FIG. 2 of a device end segment of the mobile drip irrigation device shown in FIG. 1, illustrating details of anchoring and retaining the drip tubes of that end segment.

The last or end device segment 26 at the outer or distal end of the water distribution conduit 24 does not include a truss structure 34 with the triangularly shaped frames 36 and the truss rods 40, as shown in FIGS. 1 and 4. Furthermore, no motorized tower 28 is present on the distal end of the last device segment 26. Instead, an overhead suspension structure 60 holds the distribution conduit 24 of the last device segment 26 above the soil, as shown in FIG. 4. The suspension structure 60 includes an overhead triangular support 62 which is connected to and extends above the last motorized tower 28 of the mobile drip irrigation device 22. Two suspension cables 64 extend from a distal end 66 of the distribution conduit 24 to the outside the ends of the overhead triangular support 62 and from there to the next inward adjacent motorized tower 28 (not shown in FIG. 4). Tension in the suspension cables 64 holds the distribution conduit 24 of the end device segment 26 above the soil.

An inverted T-shaped bracket 68 is connected to the distal end 66 of the distribution conduit 24. A downward extending vertical leg 70 of the bracket 68 positions a horizontally extending leg 72 at generally the same height as the brackets 52 connected to the motorized towers 28. The anchoring cable 50 extends from the bracket 52 of the adjoining last motorized tower 28 and connects to the center of the horizontal leg 72. In addition, two retaining cables 74 extend from opposite ends of the bracket 52 connected to the adjoining last motorized tower 28 and connect to the ends of the horizontal leg 72. The two retaining cables 74 extend generally in alignment with the truss rods 40 of the device segment 26 adjoining the outermost device segment 26. In this manner, the anchoring cable 50 is extended along the length of the last device segment to connect to the upper portions of the substantially rigid drop tubes 48. The two retaining cables 74 function in a similar manner as the truss rods 40 (FIG. 3) for connecting the guide wires 56 from the lower portions of the substantially rigid drop tubes 48. As a consequence, the drop tubes 48 associated with the outermost or last device segment 26 are anchored and retained in substantially the same manner as the drop tubes 48 are anchored and retained to the inner device segments 26 (FIG. 2).

A bracket 75 (FIG. 1) similar to the bracket 68 (FIG. 4) may be used on the innermost device segment 26 adjoining the pivot tower 32, if necessary, to support the anchoring cable 50 and to otherwise provide advantages for anchoring and retaining the substantially rigid drop tubes 48 from the innermost device segment similar to those advantages described with respect to the outer device segment (FIG. 4).

Thus, the upper portion of the substantially rigid drop tubes 48 are anchored and retained by the upper anchoring cable 50 and the elbows 46, and the lower portions of the substantially rigid drop tubes 48 are anchored and retained by the guide wires 56 connected to the truss rods 40 and retaining cables 74. Anchoring and retaining the drop tubes 48 in this manner ensures that the lower end of the drop tubes 48 remain in relatively fixed predetermined positions as the mobile drip irrigation device 22 moves over the agricultural field. Maintaining the lower ends of the drop tubes 48 in relatively fixed predetermined positions also ensures that the drip tubes 20 will follow behind the movement path of the lower ends of the drop tubes 48, causing the drip tubes 20 to be guided in the desired pathways.

With their desired or uniform spacing, the drip tubes 20 distribute the water precisely and uniformly as they move over the agricultural field. The drip tubes 20 are not likely to become entangled with one another because of the guiding effect of the relatively fixed positions of the lower ends of the drop tubes 48, thereby overcoming one of the major problems of previous mobile drip irrigation systems. The relatively fixed positions of the lower ends of the drop tubes 48 permit the drip tubes 22 to move in pathways across and at angles to planting furrows while maintaining the uniform spacing.

The anchoring and retaining arrangement shown and described above in connection with FIGS. 1-4 is particularly suitable for plants which grow to relatively high heights above the soil and which may have relatively stiff stalks, such as corn or maize. The anchoring and positioning arrangement moves the substantially rigid drop tubes through the relatively tall plants without being substantially distorted in position, even when the substantially rigid drop tube 48 contacts tall and relatively stiff stalks of the plants.

The flexible drop tubes used in previous mobile drip irrigation devices may be made more rigid for use in accordance with the present invention by inserting the flexible drop tubes into a slightly larger diameter substantially rigid pipe. The substantially rigid pipe is thereafter supported by the anchoring cable 50 and the guide wires 56 in the manner described. The flexible drop tubes used in previous mobile drip irrigation devices can also be replaced by drop tubes having substantially rigid characteristics.

Figure 5:
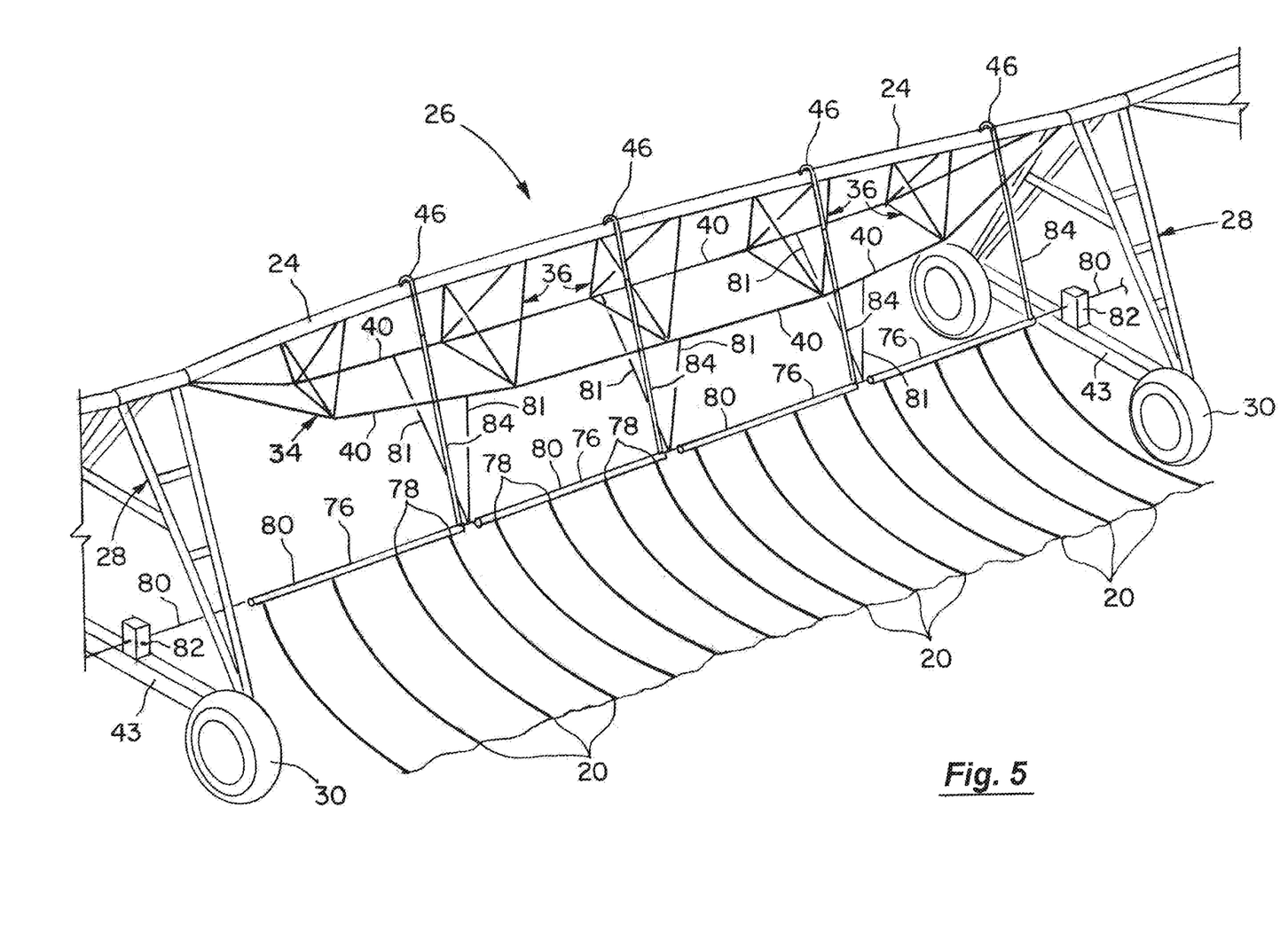
FIG. 5 is a perspective view of a device segment of the mobile drip irrigation device similar to that shown in FIG. 2, which illustrates anchoring and retaining the drip tubes in a different manner.

Another improved technique for anchoring and retaining the drip tubes 20 to maintain a predetermined desired spacing when moving across the soil is shown in FIG. 5. One or more distribution manifolds 76 is used with each device segment 26, and the drip lines 20 are directly connected to outlet ports 78 of each distribution manifold 76. Each distribution manifold 76 is connected to and suspended above the soil by a lower anchoring cable 80. The lower anchoring cable 80 extends between brackets 82 attached to the braces 43 of the adjoining motorized towers 28. Clamps (not shown) connect the manifold 76 to the anchoring cable 80. Water is delivered to each distribution manifold 76 from a conventional flexible drop tube 84. The upper end of the drop tube 84 is connected to the outlet port 44 (FIG. 3) of the distribution conduit 24 by the elbow 46, and the lower end of each drop tube 84 is connected to deliver the water into the distribution manifold 76.

The lower anchoring cable 80 maintains the distribution manifold 76 and its connected drip tubes 20 in predetermined spaced apart positions along the length of the device segment 26 and at a predetermined height above the soil. Preferably, the height where each manifold 76 connects to the drip lines 20 is no greater than about four feet above the soil, and preferably in the range of one to four feet above the soil. One or more guide wires 81 are connected to extend from spaced apart locations along the anchoring cable 80 upward to the front and rear truss rods 40, in a manner somewhat similar to the extension of the guide wires 56 from the lower portions of the substantially rigid drip tubes 40 to the truss rods 40 (FIG. 3). The guide wires 81 prevent the lower anchoring cable 80 and each attached manifold 76 from moving significantly to the rear relative to the forward movement of the device segment 26 as the drip tubes 20 are pulled across the agricultural field.

The distribution manifold 76 allows more drip tubes 20 to be used, when desired, compared to the number of outlet ports 44 (FIG. 3) of the distribution conduit 24. A single outlet port 44 from the distribution conduit 24 supplies sufficient water to the distribution manifold 76 to allow multiple drip tubes 20 to be connected and adequately supplied with water. Using more drip tubes 20 decreases the spacing between adjacent drip tubes 20, which may prove desirable depending upon the type of plants irrigated and the amount of water required.

Figure 6:
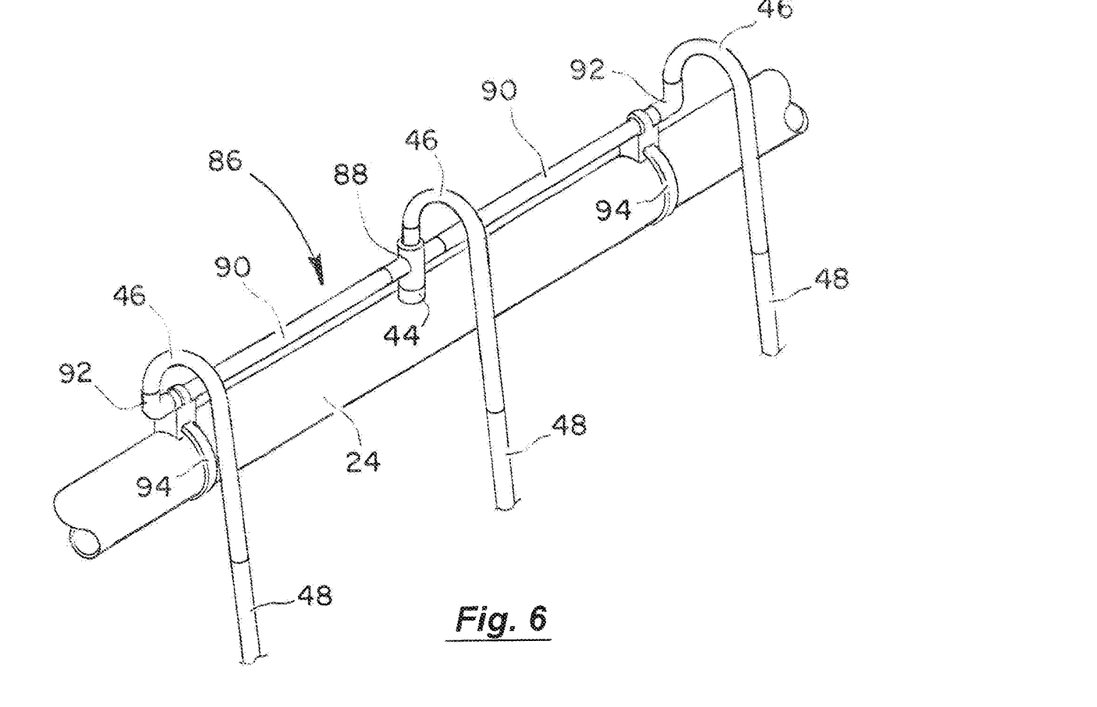
FIG. 6 is a perspective view of an adapter connected to an outlet port of a water distribution conduit of the mobile drip irrigation device shown in FIGS. 1-4, used to increase the number of drop tubes and drip tubes.

Another way of increasing the number of drip tubes 22 compared to the number of outlet ports 44 in the distribution conduit 24 (FIG. 3) involves the use of a multiple port adapter 86 shown in FIG. 6. Each adapter 86 includes a cross connector 88 which is connected to the outlet port 44. Flexible hoses 90 are connected to the opposite branches of the cross connector 88 and extend along the water distribution conduit 24 in opposite directions from the outlet port 44. The outer end of each hose 90 connects to a right angle connector 92. Each right angle connector 92 is held rigidly in position on the distribution conduit 24 by a circular clamp 94. One elbow 46 is then connected to each of the right angle connectors 92 and to the cross connector 88. The upper ends of drop tubes 48 are then connected to each of the elbows 46. The upper portion of each drop tube 48 connected to the multiple port adapter 86 is connected to the anchoring cable 50 with a clamp 54 (FIG. 3). The lower portion of each drop tube 48 is connected to the truss rods 40 by the guide wires 56 and the clamps 58 and 59 (FIG. 3). Connected in this manner, each of the substantially rigid drop tubes 48 is anchored and retained in the manner as previously described.

One problem previous mobile drip irrigation systems is that holes are quickly worn into the previous drip tubes by their continued engagement with and frictional movement over the soil. The problem of holes wearing into previous drip tubes is particularly prevalent when the soil freezes or when the soil contains a high content of sand or other sizable rigid particles. Moving the previous drip tubes over frozen, sandy or particulate soil greatly accelerates the frictional wear. Of course, the unintended holes worn into the previous drip tubes cause unpredictable and uncontrolled water flow through those holes.

Figure 7:
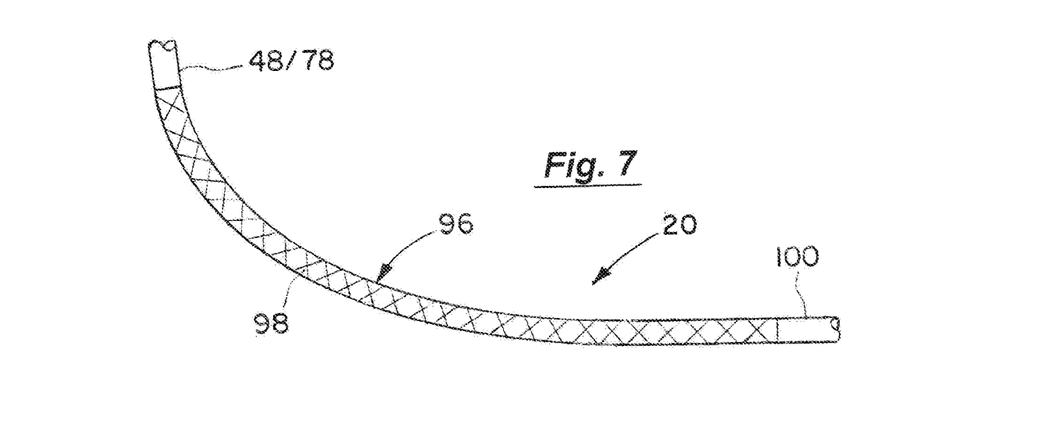
FIG. 7 is a perspective view of a leading section of a drip tube of the mobile drip irrigation device according to the present invention.

Another improvement of the invention addresses the problem of holes worn into previous drip tubes. The improvement involves attaching a leading section 96 of relatively flexible and abrasion resistant hose 98 to the forward end of each drip tube 20, as shown in FIG. 7. Each leading section 96 connects to one drop tube 48 (FIG. 3) or to an outlet port 78 of the distribution manifold 76 (FIG. 5). The flexible nature of the hose 98 permits the leading section 96 to bend toward the soil and ultimately achieve a horizontal parallel relationship with the soil at its rear end. The flexible hose 98 is conventional and reinforced with internal interlaced flexible wires or wear-resistant fibers (not shown)

which resist wear when moved over the soil, including frozen soil and soil which includes a substantial content of sand or other rigid particles.

Figure 8:
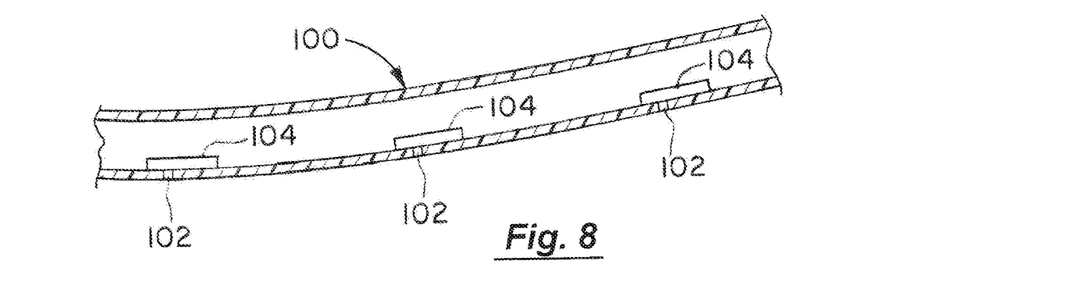
FIG. 8 is a longitudinal cross-sectional view of a water emitting section of a drip tube which includes pressure-compensating and constant-volume flow emitters according to the present invention.

A water emitting section 100 of the drip tube 20 is connected to the rear end of the leading section 96 of flexible hose 98 (FIGS. 7, 2 and 3). As shown in FIG. 8, the water emitting section 100 of the drip tube 20 includes ports 102 formed at predetermined and preferably fixed intervals along its length. Water flows through the ports 102 onto the soil. Because the leading section 96 of the drip tube 20 bends downwardly until it engages the soil in a parallel manner, the water emitting section 100 extends entirely in substantially parallel alignment with the soil behind the rear portion of the leading section 96. The water emitting section 100 is not required to make angular contact the soil. Avoiding such angular contact diminishes the amount of friction and the risk of wearing unintended holes in the water emitting section 100 of the drip tube 20. Furthermore, the water emitted from the ports 102 creates a lubricating effect which further reduces the friction on the following portions of the water emitting section 100 during movement in the intended pathways over those previously wetted areas of the soil.

Another significant problem with previous mobile drip irrigation devices is an inability to deliver precisely controlled amounts of water from the drip tubes. The present invention overcomes this problem by using pressure-compensating constant-volume flow emitters 104 located inside the water emitting section 100 of the drip tubes 20 at the water delivery ports 102, as shown in FIG. 8. The pressure-compensating constant-flow emitters 104 deliver a constant volume of water once the pressure of water surrounding the emitter 104 reaches or exceeds a predetermined level. Each emitter 104 therefore delivers a constant predetermined volume of water from each of the delivery ports 102 so long as sufficient water pressure surrounds it. The distal end of each water emitting section 100 is closed, and sufficient water pressure is delivered throughout the length of each water emitting section 100 to assure that each emitter 104 experiences adequate pressure to deliver the constant flow volume of water.

Fixing the emitters 104 at predetermined fixed and regular intervals along each of the water emitting sections 100 of the drip tubes 20, allows the length of each of the drip tubes to be adjusted to deliver the desired amount of water over the path traversed by the drip tubes 20. Those drip tubes 20 located at the outer radial positions on the pivot mobile drip irrigation device 22 (FIG. 1) move faster over the soil than those drip tubes located at an inner radial position. T o achieve uniform water distribution per linear unit of path length traversed, the water emitting sections 100 of the radially outer drip tubes 20 must be longer in length than the drip tubes located at a radial inward position. The longer water emitting sections 100 include more emitters 104 at fixed intervals delivering water through the delivery ports 102. More water must be distributed from the faster moving radial outward drip tubes, compared to lesser water delivered from the slower moving radially inward drip tubes 20 to achieve the desired amount of water delivered per linear unit of path length. A simple mathematical relationship establishes the length of the water emitting sections 100 according to their radial positions along the water distribution conduit 24 (FIGS. 1 and 2). In general, each linear measurement unit of the pathways traversed by the drip tubes 20 should receive substantially the same amount of water, assuming similar soil and growing conditions.

The significance of the improvements resulting from using pressure-compensating and constant-volume flow emitters 104 is better appreciated in relation to the characteristics of previous mobile drip irrigation devices. In previous mobile drip irrigation systems, no attempt was made to maintain controlled water emission from the drip tubes 20, insofar as is presently known. Direct holes were formed through the previous drip tubes at spaced intervals. The water flow from the holes was not a constant volume due to the inherent reduction of pressure within the drip tube resulting from the water flowing from the upstream holes. Consequently, the pressure variation prevented a regulated flow of water from the holes in the previous drip tubes. Pressure regulators were attached to each drop tube in previous mobile drip irrigation systems to regulate the pressure of water delivered into each drip tube. However, the pressure of the water was regulated only at its input into the previous drip tube, which did not address the problem of pressure variations along the length of the previous drip tube because of the water flow from the upstream holes. As a consequence, the variable and uncontrolled water flow prevented precise and uniform distribution.

The use of the pressure-compensating and constant-volume flow emitters 104 has achieved constant and controllable water flow, because sufficient pressure is maintained throughout the entire length of the water emitting section 100 of the drip tube 20 to ensure that each of the emitters 104 delivers the desired constant volume. The pressure-compensating and constant-volume flow emitters 104 are conventional items, but have not been used previously to control flow from drip tubes of a mobile drip irrigation device insofar as is presently known.

Conventional connectors connect the flexible leading section 96 of the flexible hose 98 to the lower ends of the drop tubes 48 and to the manifold ports 78 (FIGS. 3 and 5). Conventional connectors also connect the leading section 96 (FIG. 7) to the water emitting section 100 (FIG. 8) of the drip tube 20.

The leading section 96 of the flexible hose 98 is considerably more flexible than the flexibility of the water emitting section 100 of the drip tube 20. Consequently, when the direction of the mobile irrigation device 22 is reversed, as would occur at the end of an arcuate movement path which did not circumscribe a complete circle, the leading section 96 of the flexible hose 98 readily flexes to guide the following more rigid water emitting section 100 in the reversal of movement. The flexibility of the leading section 96 permits the less flexible water emitting section 100 to bend gently and reverse its direction and follow the flexible leading section 96 in the desired pathway without kinking.

A reversal of direction of a previous mobile drip irrigation system forced the less flexible drip tube to bend substantially. The degree of bending frequently kinked the previous drip tube or introduced permanent bends into it. The kinks and permanent bends remained in the less flexible previous drip tube even when reversal in movement was complete. Those kinks and permanent bends inhibited or prevented water flow through the previous drip tube, thereby resulting in no, unpredictable and/or variable water flow.

Figure 9:
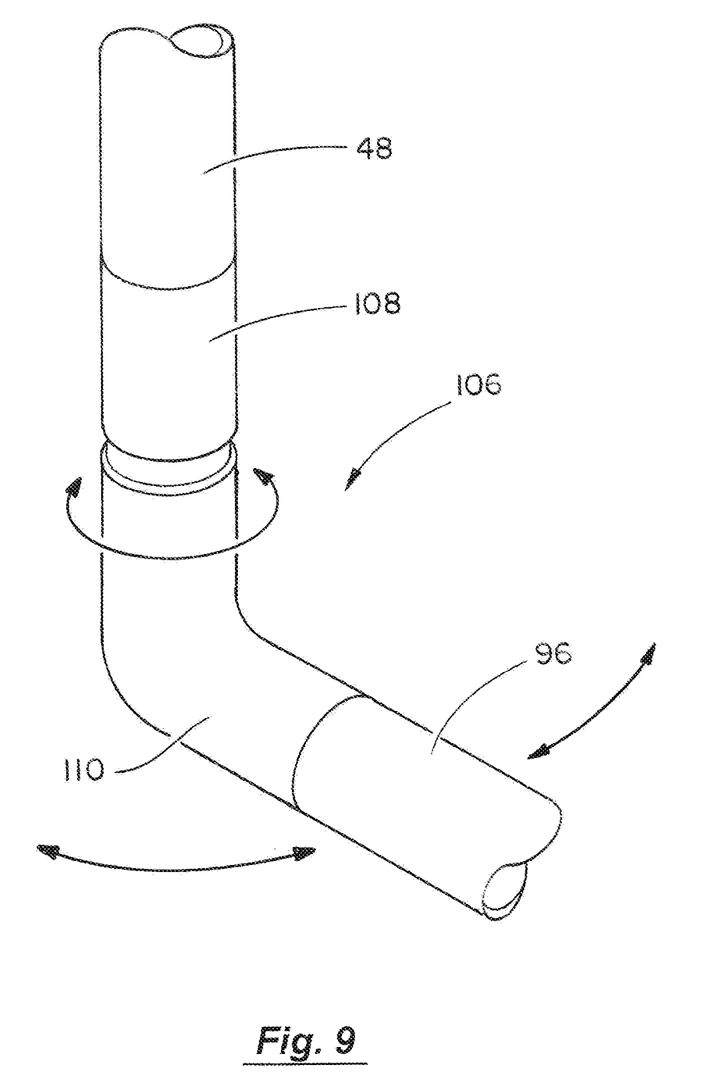
FIG. 9 is a perspective view of a conventional swivel coupling used to connect a drip tube to a drop tube shown in FIG. 3 or to a distribution manifold shown in FIG. 5 according to the present invention.

Another improvement of the present invention which further enhances reversing the direction reversing capability of the mobile irrigation device 22, is a swivel elbow coupling 106 shown in FIG. 9. An inlet portion 108 of the swivel elbow coupling 106 is connected to the outlet of the substantially rigid drop tube 48 (FIG. 3) or to the outlet port 78 of the manifold 76 (FIG. 5). An outlet portion 110 of the swivel elbow coupling 106 is connected to the leading section 96 of the flexible hose 98 of the drip tube 20. The swivel elbow coupling 106 is conventional and allows the outlet portion 110 to rotate relative to the inlet portion 108. A fluid seal (not shown) between the portions 108 and 110 prevents leakage of water from between the inlet and outlet portions when they swivel relative to one another. The outlet portion 110 is generally oriented parallel to the soil, which decreases the degree of curvature of the leading section 96 of the flexible hose 98 leading to the water emission section 100 (FIG. 7). The swiveling capability of the coupling 106 facilitates bending the leading section 96 of the flexible hose 98 when the direction of movement of the mobile irrigation device 22 is reversed.

The improvements of the present invention have been demonstrated. Approximately half of a corn crop was irrigated using the rigid drop tubes 48 in accordance with the present invention, and the remaining half of the same crop was irrigated with conventional low hanging sprinklers suspended by conventional flexible drop tubes. The same mobile irrigation device was used to deliver the water to the conventional low hanging sprinklers on the flexible drop tubes and to drop tubes 28 and connected drip tubes 20 according to the present invention. A concentric section of corn was irrigated in accordance with the present invention and another concentric section was irrigated using the low hanging sprinklers. The corn irrigated in accordance with the present invention showed greater yield and earlier maturity. The corn irrigated with the low hanging sprinklers heads was more prone to weed growth. Irrigation from the present invention resulted in about twice the available moisture in the soil to a depth of more than twice the depth of moisture accumulated in the soil from irrigation with the low hanging sprinklers heads. Extrapolating these comparison characteristics demonstrates that a more productive crop can be grown more quickly by using 20% to 50% less water than the amount of water used by the low hanging sprinklers. Results similar to those of the described corn example were also achieved with a wheat crop.

The nature and significance of the improvements and advantages of the present invention, and their comparison to previous mobile drip irrigation systems, have been discussed in detail above. The improvements and advantages of the present invention will become more apparent upon gaining a full appreciation of the invention.

Preferred embodiments and examples of implementing the invention and many of its improvements have been described with a degree of particularity. The detail of the description is not necessarily intended to limit the scope of the invention. The scope of the invention is defined by the following claims.

The invention claimed:

1. A mobile drip irrigation device comprising:
   a water distribution conduit supported by motorized towers for movement above the soil; and
   a plurality of drip tubes positioned to contact and move across soil while emitting water from the drip tubes directly onto the soil wherein each of the plurality of drip tubes is operatively connected at a forward end to receive water supplied from the water distribution conduit, and wherein
   each drip tube includes a water emitting section which contacts the soil and moves over the soil with movement of the water distribution conduit, a plurality of ports formed through the drip tube at predetermined intervals along the length of the drip tube, and a plurality of constant-volume flow emitters located within the drip tube, one emitter associated with each port, each emitter operatively responding to a predetermined pressure of water within the drip tube to deliver a constant-volume flow of water through the port with which the emitter is associated; and
   the mobile drip irrigation device further comprises a plurality of drop tubes connected between said water distribution conduit and said plurality of drip tubes, and wherein each drip tube includes a leading section of flexible hose at the forward end of each drip tube wherein the water emitting section is less flexible than the leading section of flexible hose.

2. The mobile drip irrigation device as in claim 1 wherein the leading section of flexible hose of each drip tube comprises an abrasion resistant hose.

3. The mobile drip irrigation device as in claim 2 where in the abrasion resistant hose is reinforced with internal interlaced flexible wires or wear resistant fibers.

4. The mobile drip irrigation device as in claim 1, wherein the flexibility of the leading section is sufficient to guide the water emitting section through a reversal in direction of movement of the water distribution conduit without inducing a kink or permanent bend in either one of the leading section or the water emitting section.

5. A mobile drip irrigation device comprising:
   a water distribution conduit supported by a truss structure supported on towers for movement above soil;
   a plurality of drop tubes and a plurality of elongated drip tubes positioned to contact and move across soil while emitting water from the drip tubes directly onto the soil;
   each drop tube having an upper end which is connected to receive water from the water distribution conduit, and each drop tube having a lower end which is connected to supply water to a forward end of a respective one of said elongated drip tubes; a lower portion of each drop tube is anchored and retained against substantial movement perpendicularly and longitudinally relative to the water distribution conduit;
   wherein each elongated drip tube includes;
      a leading section of flexible hose at the forward end of each elongated drip tube; and
      a water emitting section of tubing connected to the leading section, the water emitting section of tubing being less flexible than the leading section of flexible hose and including a plurality of water emitting ports formed through the water emitting section of tubing in spaced relation for delivering water, received from the water distribution conduit and through a respective drop tube, to the soil;
      a plurality of constant-volume flow emitters located within the water emitting section of tubing, one emitter associated with each water emitting port, each emitter operatively responding to a predetermined pressure of water within the elongated drip tube to deliver a constant-volume flow of water through the water emitting port with which the emitter is associated.

6. The mobile drip irrigation device as in claim 5, wherein the flexibility of the leading section is sufficient to guide the water emitting section through a reversal in direction of movement of the water distribution conduit without inducing a kink or permanent bend in either one of the leading section or the water emitting section.

7. The mobile drip irrigation device as defined in claim 5, of the center pivot type, wherein:
   one end of the water distribution conduit is oriented radially with respect to a center pivot point on the soil of an agricultural field;

the motorized towers move the radially-extending water distribution conduit in a circular or arcuate path with regard to the center pivot point; and the length of the water emitting section of each elongated drip tube is selected to deliver a predetermined amount of water per linear unit of the path traversed by each elongated drip tube.

8. A mobile drip irrigation device comprising:

a water distribution conduit supported by a truss structure supported on towers for movement above soil;

at least one manifold positioned below said water distribution conduit and above the soil, said at least one manifold is anchored relative to the towers;

a plurality of drop tubes connected between said water distribution conduit and said at least one manifold and supplying water from said water distribution conduit to said at least one manifold;

a plurality of elongated drip tubes positioned to contact and move across soil while emitting water from the drip tubes directly onto the soil, each elongated drip tube connected at a forward end to said at least one manifold and receiving water from the manifold; each of said elongated drip tubes comprising:

a leading section of flexible hose at the forward end of each elongated drip tube;

a water emitting section of tubing connected to the leading section, the water emitting section of tubing being less flexible than the leading section of flexible hose and including a plurality of water emitting ports formed through the water emitting section of tubing in spaced relation for delivering water, received from the manifold, to the soil; and a plurality of constant-volume flow emitters located within the water emitting section of tubing, one emitter associated with each water emitting port, each emitter operatively responding to a predetermined pressure of water within the elongated drip tube to deliver a constant-volume flow of water through the water emitting port with which the emitter is associated.

9. The mobile drip irrigation device as in claim 8, wherein the flexibility of the leading section is sufficient to guide the water emitting section through a reversal in direction of movement of the water distribution conduit without inducing a kink or permanent bend in either one of the leading section or the water emitting section.

10. The mobile drip irrigation device as defined in claim 8, of the center pivot type, wherein:

one end of the water distribution conduit is oriented radially with respect to a center pivot point on the soil of an agricultural field;

the motorized towers move the radially-extending water distribution conduit in a circular or arcuate path with regard to the center pivot point; and the length of the water emitting section of each elongated drip tube is selected to deliver a predetermined amount of water per linear unit of the path traversed by each elongated drip tube.

11. A mobile drip irrigation device comprising a water distribution conduit supported by a truss structure supported between adjacent towers for movement above soil; associated with the water distribution conduit between at least two adjacent towers are a plurality of drop tubes, a manifold and a plurality of elongate drip tubes; each drop tube having an upper end which is operatively connected to receive water from the water distribution conduit and a lower end operatively connected to supply water to the manifold, the plurality of drip tubes are operatively connected to the manifold to receive water therefrom and positioned to contact and move across the soil while emitting water from the drip tubes onto the soil, the manifold is connected to an anchoring member extending between adjacent towers in spaced relation below the water distribution conduit to resist movement of the manifold in a direction generally parallel to the water distribution conduit and to maintain a relative position of each drip tube between adjacent towers; a plurality of guide members extending in longitudinally spaced relationship between the at least two adjacent towers and each guide member operatively connected between the truss structure and the anchoring member; each drip tube comprising a plurality of ports formed through the drip tube at predetermined intervals along the length of the drip tube; and a plurality of constant-volume flow emitters located within the drip tube, one emitter associated with each port, each emitter operatively responding to a predetermined pressure of water within the drip tube to deliver a constant-volume flow of water through the port with which the emitter is associated.

12. A mobile drip irrigation device comprising a water distribution conduit supported by a truss structure supported between adjacent towers for movement above soil; associated with the water distribution conduit between at least two adjacent towers are a plurality of drop tubes, a manifold and a plurality of elongate drip tubes; each drop tube having an upper end which is operatively connected to receive water from the water distribution conduit and a lower end operatively connected to supply water to the manifold, the plurality of drip tubes are operatively connected to the manifold to receive water therefrom and positioned to contact and move across the soil while emitting water from the drip tubes onto the soil, the manifold is connected to an anchoring member extending between adjacent towers in spaced relation below the water distribution conduit to resist movement of the manifold in a direction generally parallel to the water distribution conduit and to maintain a relative position of each drip tube between adjacent towers; a plurality of guide members extending in longitudinally spaced relationship between the at least two adjacent towers and each guide member operatively connected between the truss structure and the manifold; each drip tube comprising a plurality of ports formed through the drip tube at predetermined intervals along the length of the drip tube; and a plurality of constant-volume flow emitters located within the drip tube, one emitter associated with each port, each emitter operatively responding to a predetermined pressure of water within the drip tube to deliver a constant-volume flow of water through the port with which the emitter is associated.

13. A mobile drip irrigation device comprising a water distribution conduit supported by a truss structure supported between adjacent towers for movement above soil; associated with the water distribution conduit are a plurality of drop tubes and a plurality of drip tubes; each drop tube having an upper end which is operatively connected to receive water from the water distribution conduit and a lower end operatively connected to supply water to one of the plurality of drip tubes which is positioned to contact and move across the soil while emitting water therefrom onto the soil; a plurality of guide members are each connected at an upper end to the truss structure and at a lower end to one of the drop tubes to retain the lower end of each drop tube and a forward end of each drip tube against substantial movement perpendicularly relative to the water distribution conduit; each drip tube comprising a plurality of ports formed through the drip tube at predetermined intervals along the length of the drip tube; and a plurality of constant-volume flow emitters located within the drip tube, one emitter associated with each port, each emitter operatively responding to a predetermined pressure of water within the drip tube to deliver a constant-volume flow of water through the port with which the emitter is associated.

* * * * *